(12) United States Patent
Langberg

(10) Patent No.: US 7,661,680 B2
(45) Date of Patent: Feb. 16, 2010

(54) FERROFLUID MAGNETIC SEAL

(75) Inventor: Eric Aaron Langberg, Milford, PA (US)

(73) Assignee: Plantronics, Inc, Santa Cruz, CA (US)

( * ) Notice: Subject to any disclaimer, the term of this patent is extended or adjusted under 35 U.S.C. 154(b) by 0 days.

(21) Appl. No.: 11/416,192

(22) Filed: May 3, 2006

(65) Prior Publication Data
US 2007/0267413 A1 Nov. 22, 2007

(51) Int. Cl.
*F16J 15/53* (2006.01)

(52) U.S. Cl. .................. 277/629; 49/478.1

(58) Field of Classification Search .......... 277/629, 277/302, 501, 378; 49/478.1; 220/230; 292/251.5
See application file for complete search history.

(56) References Cited

U.S. PATENT DOCUMENTS

| | | | | | |
|---|---|---|---|---|---|
| 2,389,298 | A | * | 11/1945 | Ellis | 335/303 |
| 2,627,097 | A | * | 2/1953 | Ellis | 24/303 |
| 2,959,832 | A | * | 11/1960 | Baermann | 24/303 |
| 3,077,644 | A | * | 2/1963 | Kesling | 49/366 |
| 3,400,964 | A | * | 9/1968 | Baermann | 292/251.5 |
| 3,487,581 | A | * | 1/1970 | Ellingson, Jr. | 49/478.1 |
| 3,604,152 | A | * | 9/1971 | Protzman | 49/470 |
| 3,862,515 | A | * | 1/1975 | Baermann | 49/478.1 |
| 4,035,875 | A | * | 7/1977 | Kobelt | 24/585.12 |
| 4,171,818 | A | * | 10/1979 | Moskowitz et al. | 277/410 |
| 4,252,328 | A | * | 2/1981 | Raj et al. | 277/302 |
| 4,999,951 | A | * | 3/1991 | Keys et al. | 49/478.1 |
| 5,826,883 | A | * | 10/1998 | Cho et al. | 277/410 |
| 6,131,341 | A | * | 10/2000 | Wade et al. | 49/478.1 |
| 6,487,819 | B1 | * | 12/2002 | Goldberg et al. | 49/478.1 |
| 6,838,963 | B2 | * | 1/2005 | Zimmerling et al. | 335/205 |
| 7,267,378 | B2 | * | 9/2007 | Drumm | 292/251.5 |
| 2004/0012158 | A1 | * | 1/2004 | Neuhaus | 277/629 |

OTHER PUBLICATIONS

"Ferrofluid," Wikipedia, the free encyclopedia, http://en.wikipedia.org/wiki/Ferrofluid, pp. 1-3.
"Rotary Seals," http://www.roymech.co.uk/Useful_Tables/Seals/Rotary_Seals.html, pp. 1-4.

* cited by examiner

*Primary Examiner*—Alison K Pickard
(74) *Attorney, Agent, or Firm*—Greenberg Traurig LLP; Richard Kurtz

(57) ABSTRACT

A ferrofluid based magnetic seal, comprising at least one gasket, the at least one gasket comprising a flexible, closed cell material, such as, without limitation, neoprene, polyvinylchloride, or plastic, and a ferrofluid core; a first housing, wherein a first face of the first housing is designed to receive at least a portion of the gasket; a second housing, wherein a first face of the second housing is designed to receive at least a portion of at least one magnet; and wherein the at least one magnet is positioned such that when the first housing and the second housing are in close proximity, the at least one magnet is positioned substantially along the length of the at least one gasket.

18 Claims, 7 Drawing Sheets

FERROFLUID MAGNETIC SEAL

FIELD OF THE INVENTION

The present invention relates to the field of magnetic seals, and more specifically involves the use of a ferrofluid filled gasket and a magnet to create a seal.

BACKGROUND OF THE INVENTION

Ferrofluid is a stable suspension of magnetic particles in a liquid carrier. The particles, which have an average size of about 10 nm, are coated with a surfactant which prevents the particles from agglomerating, even when a strong magnetic field gradient is applied to the ferrofluid. A typical ferrofluid may contain by volume 5% magnetic solid, 10% surfactant and 85% carrier. According to Ferrotec (USA) Corporation, a manufacturer of ferrofluids, a wide variety of magnetic solids, surfactants, and carriers are available, which permits a user to tailor the ferrofluid's properties based on the specific application.

Regardless of their composition, ferrofluids generally behave the same. In the absence of a magnetic field, the magnetic moments of the particles in the ferrofluid are randomly distributed and the fluid has no net magnetization. When a magnetic field is applied to a ferrofluid, the magnetic moments of the particles orient along the field lines. Ferrofluids typically respond almost immediately to changes in the applied magnetic field and when the applied field is removed, the moments randomize again quickly. In a gradient field the whole fluid responds as a homogeneous magnetic liquid which moves to the region of highest flux. This means that ferrofluids can be precisely positioned and controlled by an external magnetic field. The retention force of a ferrofluid can be adjusted by changing either the magnetization of the fluid or the magnetic field in the region. Additional information regarding ferrofluids can be found at http://en.wikipedia.org/wiki/Ferrofluid, which is incorporated herein by reference in its entirety.

Among their various uses, ferrofluids can be used as seals. By way of example, ferrofluids are used to seal rotary moving parts since the distance between the moving parts does not change, and the fluid can remain locked inside the seal by a constant magnetic force. This is described in more detail at http://www.roymech.co.uk/Useful_Tables/Seals/Rotary_Seals.html, which is incorporated herein by reference in its entirety. However, in applications where the distance between the parts to be sealed changes significantly, the magnetic force will not remain constant, and the fluid will not remain captured in place.

What is needed is an apparatus through which a ferrofluid can be used to selectively seal off a space without the ferrofluid dissipating.

Sealing of a linearly movable assembly is often accomplished with compression seals or gaskets. When the linear motion is accomplished by a spring or springs, however, the sealing force imparted by the spring(s) is at a minimum at one end of the range of motion. If a seal is desired at this position, the spring force may not be sufficient to provide a good seal. If the spring force is increased to overcome this situation, this results in additional forces when the spring is compressed, which can be a serious disadvantage to this sealing method.

The invention described herein overcomes this disadvantage by eliminating reliance on the spring force to create a seal.

SUMMARY OF THE INVENTION

Accordingly, the present invention is directed to a ferrofluid magnetic seal that substantially obviates one or more of the problems due to limitations and disadvantages of the related art.

An object of the present invention is to provide a magnetically-actuated seal that utilizes a ferrofluid.

Another object of the present invention is to provide a ferrofluid based magnetic seal, comprising at least one gasket, the at least one gasket comprising a flexible, closed cell material, such as rubber, neoprene, plastic polyvinylchloride, or other elastomer, and a ferrofluid core; a first component, wherein a first face of the first component is designed to receive at least a portion of the at least one gasket; a second component, wherein a first face of the second component has at least one magnet affixed thereto or embedded therein; and wherein the ferrofluid is magnetically attracted to the at least one magnet causing the gasket to be drawn into a magnetic field associated with the at least one magnet.

Still another object of the present invention is to provide a ferrofluid based magnetic seal comprising at least one gasket, the at least one gasket retaining a core comprising ferrofluid; a first housing component, wherein a first face of the first housing component has at least a portion of the at least one gasket affixed thereto; a second housing component, the second housing component comprising a magnetic gap for receiving the gasket and forming a seal therewith.

Yet another object of the invention is to provide a gasketed closure comprising a first surface and a second surface, the first and second surface being repositionable in relation to each other; the first surface having a closure region that comes in close proximity with a closure region of the second surface when the first and second surface are positioned in an extreme position with respect to their repositionable relationship; a gasket retaining a core comprising a ferrofluid, the gasket being at least substantially the length of the closure region; the closure region of the first surface comprising at least one magnet for attracting the ferrofluid and thereby causing the gasket to make a seal between itself and the closure region of the first surface; and the closure region of the second surface having a sealing means causing the gasket to make a seal between itself and the closure region of the second surface. The sealing means can be an adhesive bond, or a chemically, electrically, or thermally created weld of the materials.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A magnetic seal is provided for sealing expandable acoustic cavities and for other sealing applications. An elongated flexible bladder, tube, bag, or gasket (collectively referred to herein as a "gasket") containing ferrofluid is attached to one surface and a magnet is attached to an adjacent surface. The ferrofluid bladder is attracted to the magnet and the two contact each other to form a tight seal between the two surfaces. As the magnet approaches the bladder, magnetic particles in the fluid draw the bladder into the magnetic field and form a seal between the outside of the bladder and the inside walls of the magnetic gap.

Such a seal can be used in a wide variety of applications, including any application where a tight seal between two surfaces is desired. Such a seal may be especially useful for surfaces that move perpendicularly away from each other, and which may not be perfectly aligned or perfectly flat when proximate to each other. In one exemplary application, the seal can be used in connection with portable speaker systems that include an expandable acoustic cavity that is expanded into an open position when the speaker system is in use and compressed into a closed position to provide a compact case for travel or storage. The magnetization of the ferrofluid may be such that when the magnets are in close proximity to the ferrofluid, the attraction therebetween is sufficient to provide unaided support to the speaker system under normal usage conditions. Support may also be provided by additional mechanical or magnetic means, such as, without limitation, the use of a spring.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE INVENTION

Reference will now be made in detail to embodiments of the present invention, examples of which are illustrated in the accompanying drawings.

Figure 1A:
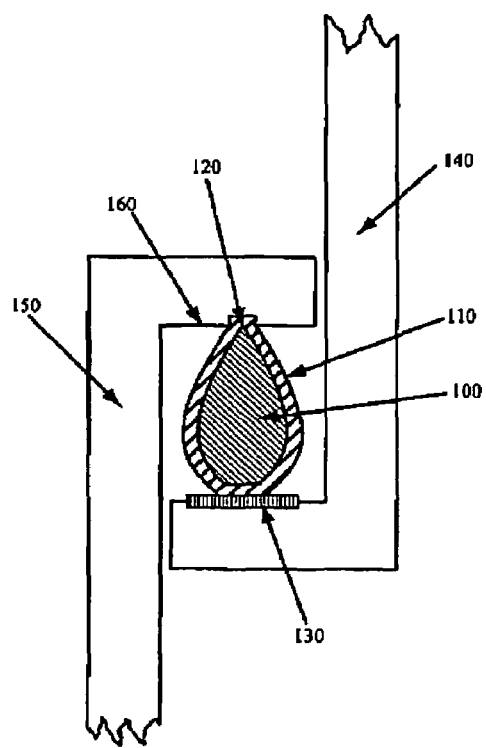
FIGS. 1a and 1b are cut-away partial side views of a housing that utilizes a ferrofluid filled gasket as a seal.
Figure 1B:
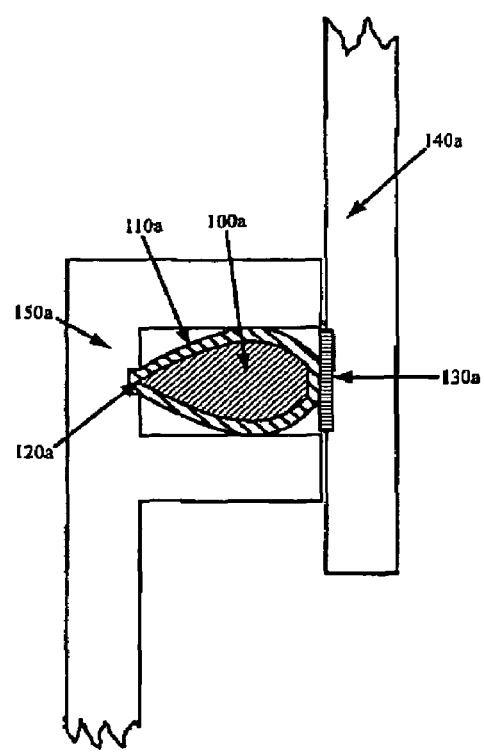

FIG. 1 is a cut-away partial side view of a housing that utilizes a ferrofluid filled gasket 110 as a seal. Although the figures used herein illustrate a gasket having a core which is completely filled by a ferrofluid, it is within the scope of the invention to provide a gasket having a core which is partially filled by a ferrofluid. In an embodiment, air, water, or other liquids and/or gases may fill the remainder of the core.

In an embodiment, gasket 110 is positioned along a surface 160 of a housing component 150 that is to be sealed. Gasket 110 may be made of a flexible, closed-cell material such that ferrofluid 100 is permanently contained therein. Such flexible, closed-cell materials include, for example, but not by way of limitation, elastomers such as neoprene, polyvinylchloride, rubber and plastic. In an embodiment, the gasket 110 may be sealed along a seam 120 using a variety of sealing means including, without limitation, electronic welding, solvent welding, thermal welding and/or adhesive bonding. Depending on the sealing means employed, seam 120 may result in a ridge or other protrusion above the surface of gasket 110. Such a seam may be attached to, or embedded into, surface 160 of first housing component 150, thereby further enhancing the strength of seam 120. In an embodiment, the gasket 110 may be extruded and thus seamless.

Figure 5:
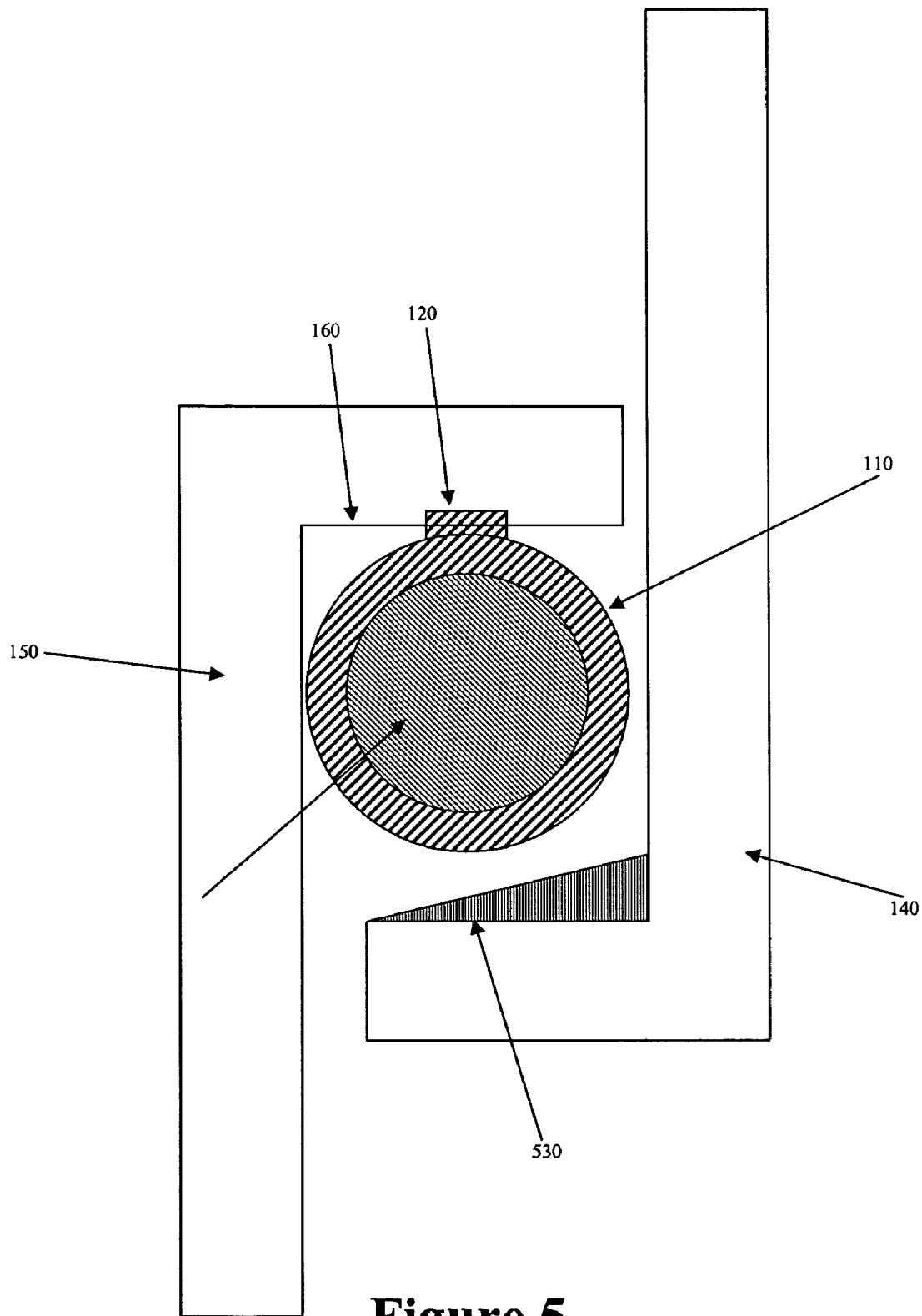
FIG. 5 is a cut-away partial side view of a housing that utilizes a ferrofluid filled gasket as a seal.

Second housing component 140 includes at least one magnet 130. Magnet 130 extends along at least a portion of the surface of second housing component 140 that is to be sealed. Although the surface of the second housing component 140 to be sealed is shown in FIG. 1 as coplanar to the surface 160 of the first housing component 150, these surfaces need not be coplanar. In an embodiment, see e.g., FIG. 5, the surface of second housing component 140 that is to be sealed is not coplanar with sealing surface 160 of first housing component 150. Nevertheless, a seal is formed regardless of the orientation of the surfaces as the ferrofluid 100 is attracted to the magnet 130 as the magnet 130 is brought into the proximity of the gasket 110. The attraction between the ferrofluid 100 and the magnet 130 can be controlled as a function of the composition of ferrofluid 100, the strength of the magnet 130, and the shape of the magnet 130. In an embodiment, the magnetic attraction between the ferrofluid 100 and the magnet 130 is sufficient to support second housing component 140.

FIG. 1a is a cut-away side view of a ferrofluid filled gasket 110a used as a seal between two surfaces 150a, 140a. In an embodiment, gasket 110a may be sealed along a seam 120a. Depending on the sealing means employed, seam 120a may result in a ridge or other protrusion above the surface of gasket 110a. Such a seam, or another portion of the gasket may be attached to, or embedded into, the surface 150a.

Surface 140a includes at least one magnet 130a. Magnet 130a extends along at least a portion of the surface 140a that is to be sealed. Although the surface 140a to be sealed is shown in FIG. 1a as coplanar to the surface 150a, these surfaces need not be coplanar. A seal is formed as the ferrofluid 100a is attracted to the magnet 130a. The ferrofluid 100a is attracted to the magnet 130a when the magnet 130a is brought into the proximity of the gasket 110a. The attraction between the ferrofluid 100a and the magnet 130a can be controlled as a function of the composition of ferrofluid 100a, the strength of the magnet 130a, and the shape of the magnet 130a. In an embodiment, the magnetic attraction between the ferrofluid 100a and the magnet 130a is sufficient to support second housing component 140a.

Figure 2:
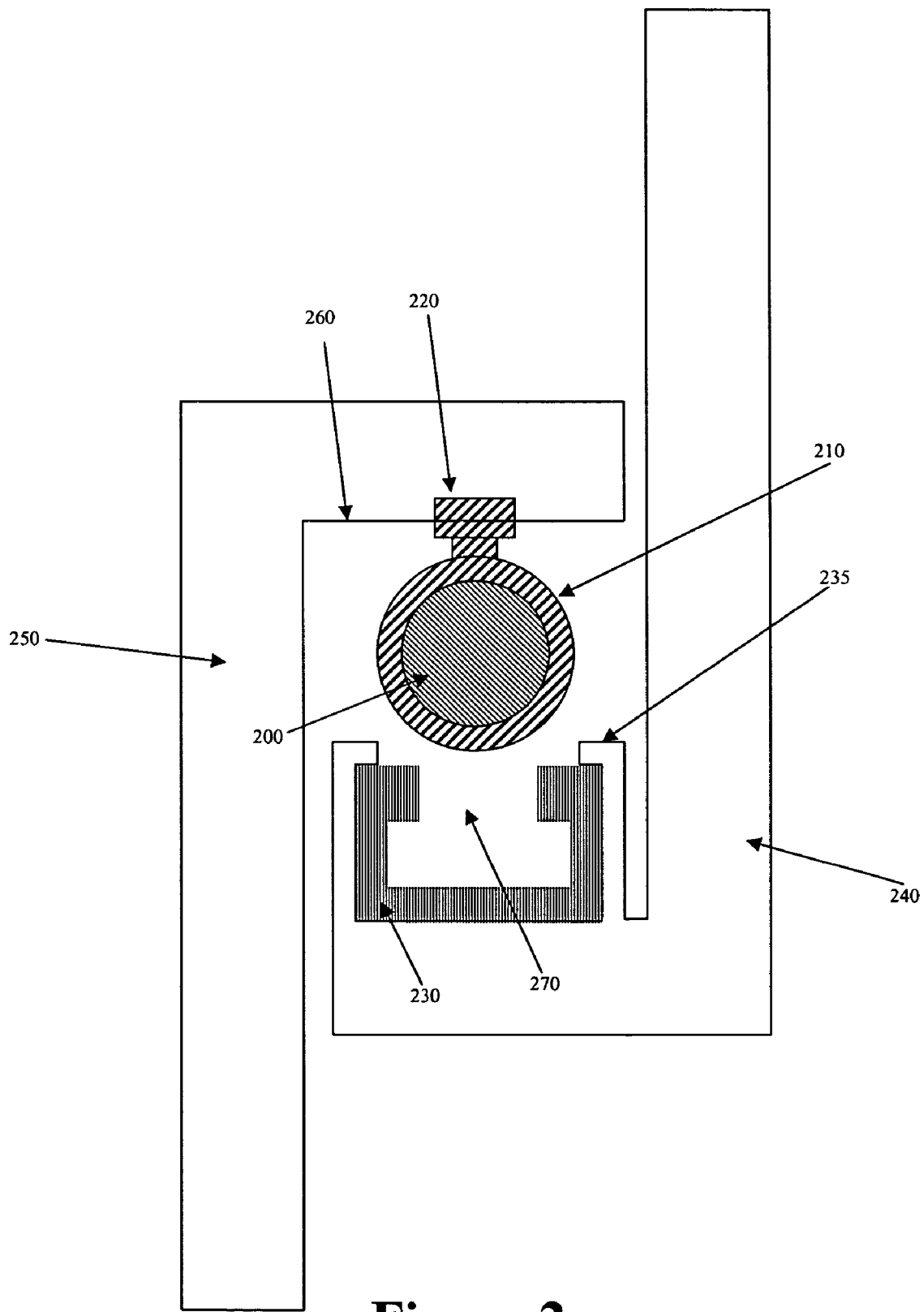
FIG. 2 is a cut-away partial side view of a housing that utilizes a ferrofluid filled gasket as a seal.

FIG. 2 is a cut-away partial side view of a housing that utilizes a ferrofluid filled gasket as a seal. In the embodiment illustrated in FIG. 2, gasket 210 is positioned along surface 260 of first housing component 250. In an embodiment, second housing component 240 includes a cavity which comprises one or more magnets 230. In the embodiment illustrated in FIG. 2, gap 270 exists between portions of magnet 230. The magnetic fields will be relatively stronger within this gap 270, and will tend to attract ferrofluid 200 more than the other surfaces of magnet 230. As a result, when brought in close proximity to gap 270, the ferrofluid 200 filling gasket 210 is drawn into gap 270, forming an air seal even where gasket 210 and gap 270 are not perfectly aligned. In addition, because gasket 210 is made of a flexible material such as an elastomer, the seal created by the attraction of ferrofluid 200 into gap 270 is flexible, and is maintained even where first housing component 250 and second housing component 240 are subject to moderate forces, such as those associated with lower frequency audio waves created in speaker systems.

As illustrated in FIG. 2, magnet 230 may be embedded within a second housing component 240, and retained therein by lip 235. Alternative retaining means may be substituted therefor, including, without limitation, adhesive bonding, without departing from the spirit or the scope of the invention.

Figure 8:
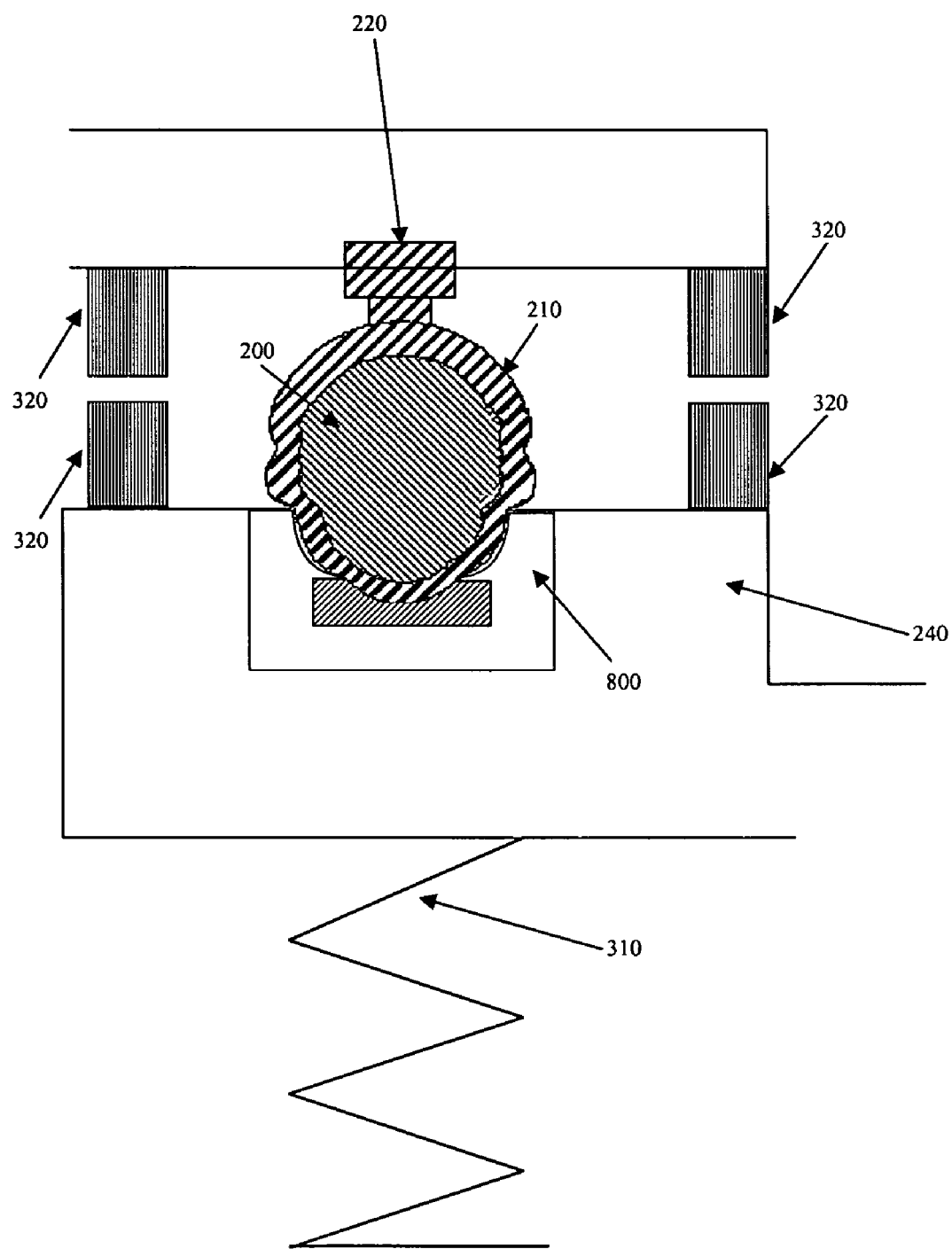
FIG. 8 is a cut-away partial side view of a housing that utilizes a ferrofluid filled gasket as a seal.

Although magnet 230 is illustrated in FIG. 2 as defining a cavity having a cross-section comprised of right angles, alternative cavity and/or magnet shapes, including, without limitation, shapes having at least partially curved cross sections, may be substituted therefor without departing from the spirit or the scope of the invention. This is illustrated in more detail in FIG. 8, wherein the surface of the magnet 800 proximate to the gasket 210 is curved.

Figure 3:
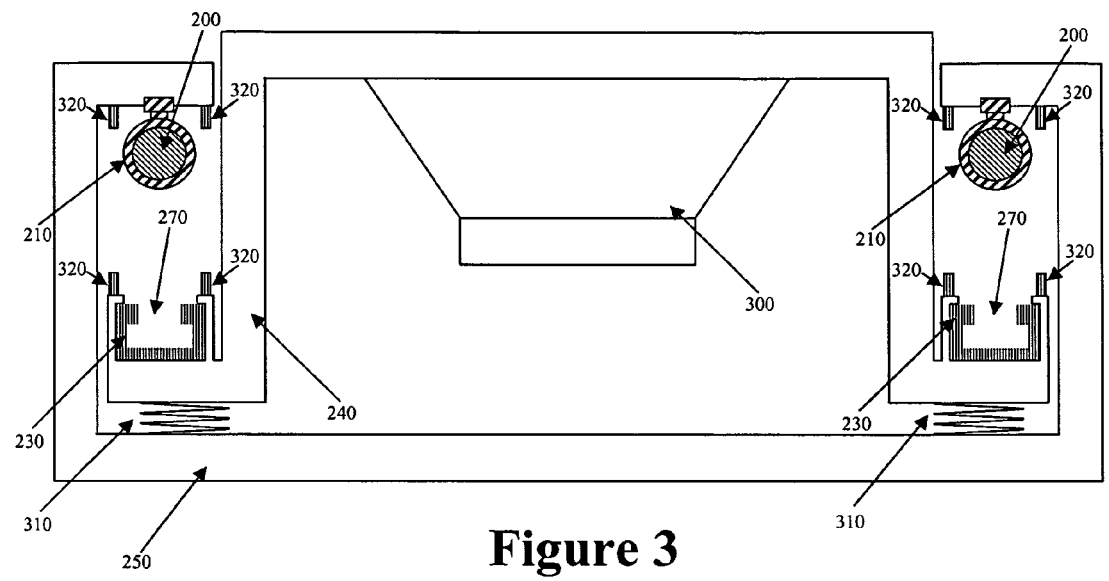
FIG. 3 is a cut-away side view of a speaker housing in the collapsed state, wherein the speaker housing utilizes a ferrofluid filled gasket as a seal and a plurality of springs to provide support.

FIG. 3 is a cut-away side view of a housing for speaker 300, wherein the housing is in the collapsed state, according to an embodiment of the invention. In the collapsed state, field from magnets 230 are not strong enough to attract and engage ferrofluid 200 because of the distance between magnets 230 and ferrofluid 200.

In an embodiment, a locking device (not shown) may be used to keep the housing in the collapsed state; and when the locking device is released, springs 310, which are under compression in the collapsed state illustrated in FIG. 3, can expand, allowing the housing to enter the expanded state.

As springs 310 expand, the force associated therewith lessens. When springs 310 are at their fullest extension, they exert the least amount of force. Because it is typically advantageous for the speaker housing to re-enter the compressed state illustrated in FIG. 3, springs 310 should be relatively easily compressible by an average user of the speaker system. The combination of these two factors means that, in the expanded state, springs 310 may not generate sufficient support to keep gasket 210 engaged in magnetic gap 270, especially when the housing is subject to forces from low frequency audio waves generated by speaker 300. In an embodiment, to help keep gasket 210 engaged with magnet 230, additional magnets 320 may be positioned along or embedded in or proximate to the surfaces to be sealed. In an embodiment (not illustrated), to maintain the seal between the housing components 240, 250 any of a variety of means may be used, including, without limitation, physical engagement of one or more latching or locking means.

Figure 4:
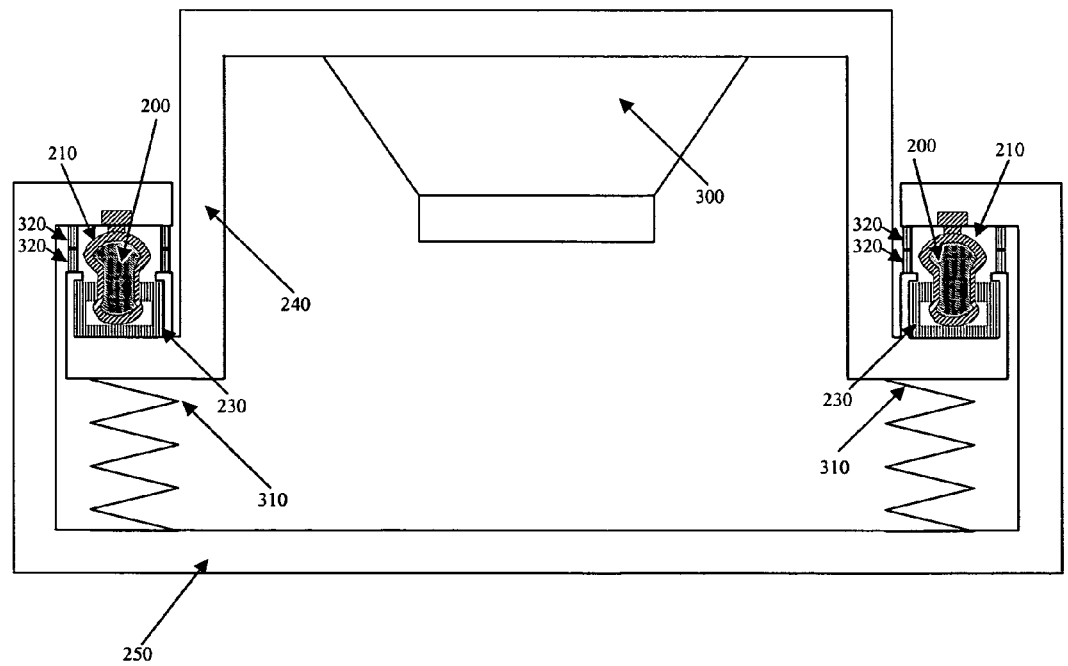
FIG. 4 is a cut-away side view of a speaker housing in the expanded state, wherein the speaker housing utilizes a ferrofluid filled gasket as a seal.

FIG. 4 is a cut-away side view of a speaker housing in the expanded state. In an embodiment, magnetic gap 270 (see FIG. 3) engages gasket 210 such that the retaining force is sufficient to permit the housing to remain in the expanded state until a user exerts additional compressive force (i.e., compressive to springs 310) on the housing components 240, 250 or speaker 300. In an embodiment, magnets 320 provide additional force to permit the housing to remain in the expanded state until a user exerts the additional compressive force. When the housing is in expanded state, the magnetic seal between magnets 230 and gasket 210 may be sufficient to be substantially air tight so that in operation, when the speaker driver in the housing compresses and rarefies air within the volume of the housing, substantially no air leakage occurs.

Figure 6:
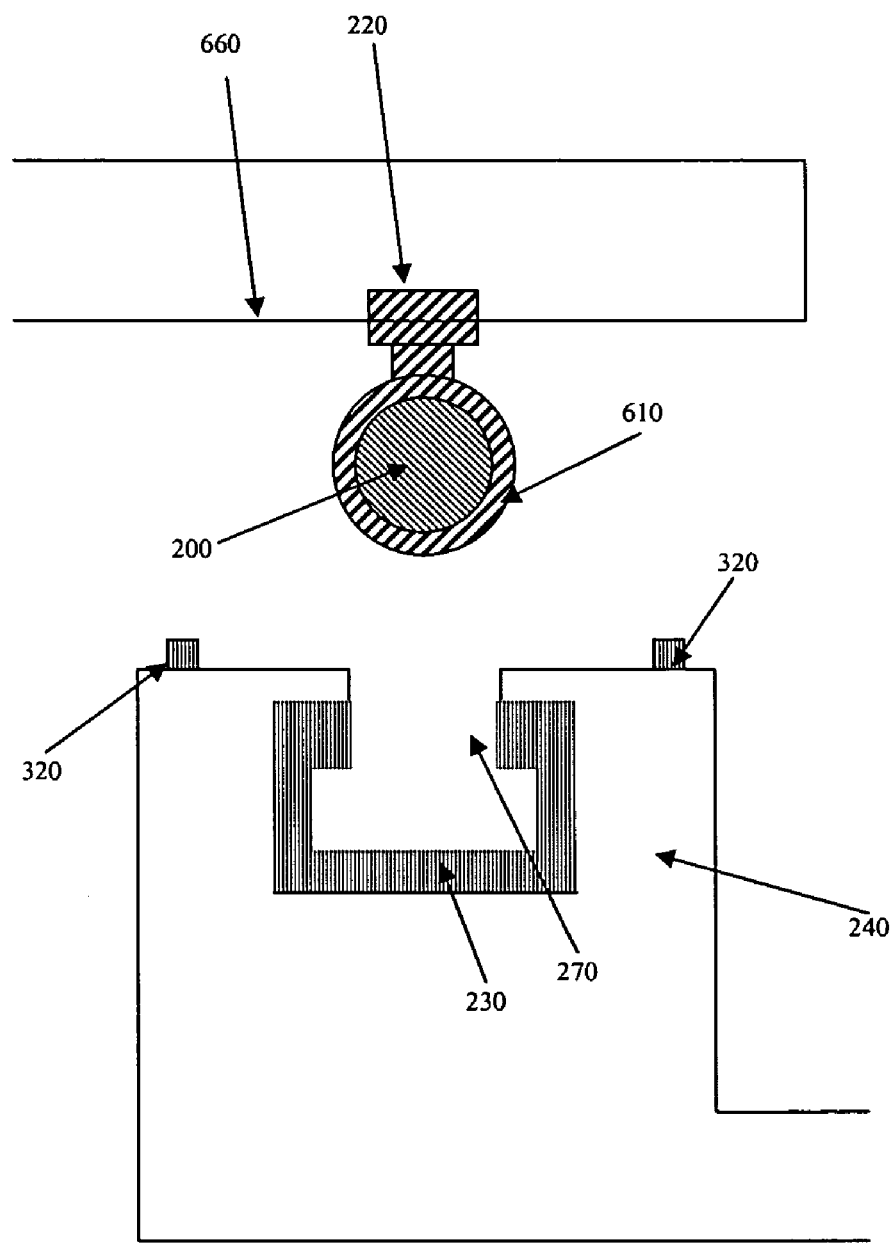
FIG. 6 is an alternative cut-away partial side view of a speaker housing that utilizes a ferrofluid filled gasket as a seal.

FIG. 6 is a cut-away partial side view of a speaker housing that utilizes a ferrofluid filled gasket as a seal. Surface 660 of FIG. 6 is made of a magnetically reactive metal. When magnets 320 are brought in the proximity of surface 660, they are attracted to surface 660. When sufficiently proximate, the attractive force between magnets 320 and surface 660 is sufficient to permit the housing to remain in the extended state. Similarly, when in the extended state, the ferrofluid core 200 of gasket 610 is attracted toward magnetic gap 270, thereby forming an air-tight seal. As described above with respect to gasket 210, gasket 610 can be made of a flexible material, such as, without limitation, an elastomer comprised of rubber, neoprene, polyvinyl chloride, plastic, or other closed cell material. This allows the air-tight seal to be maintained even when magnetic gap 270 and gasket 610 are not in perfect alignment.

Figure 7:
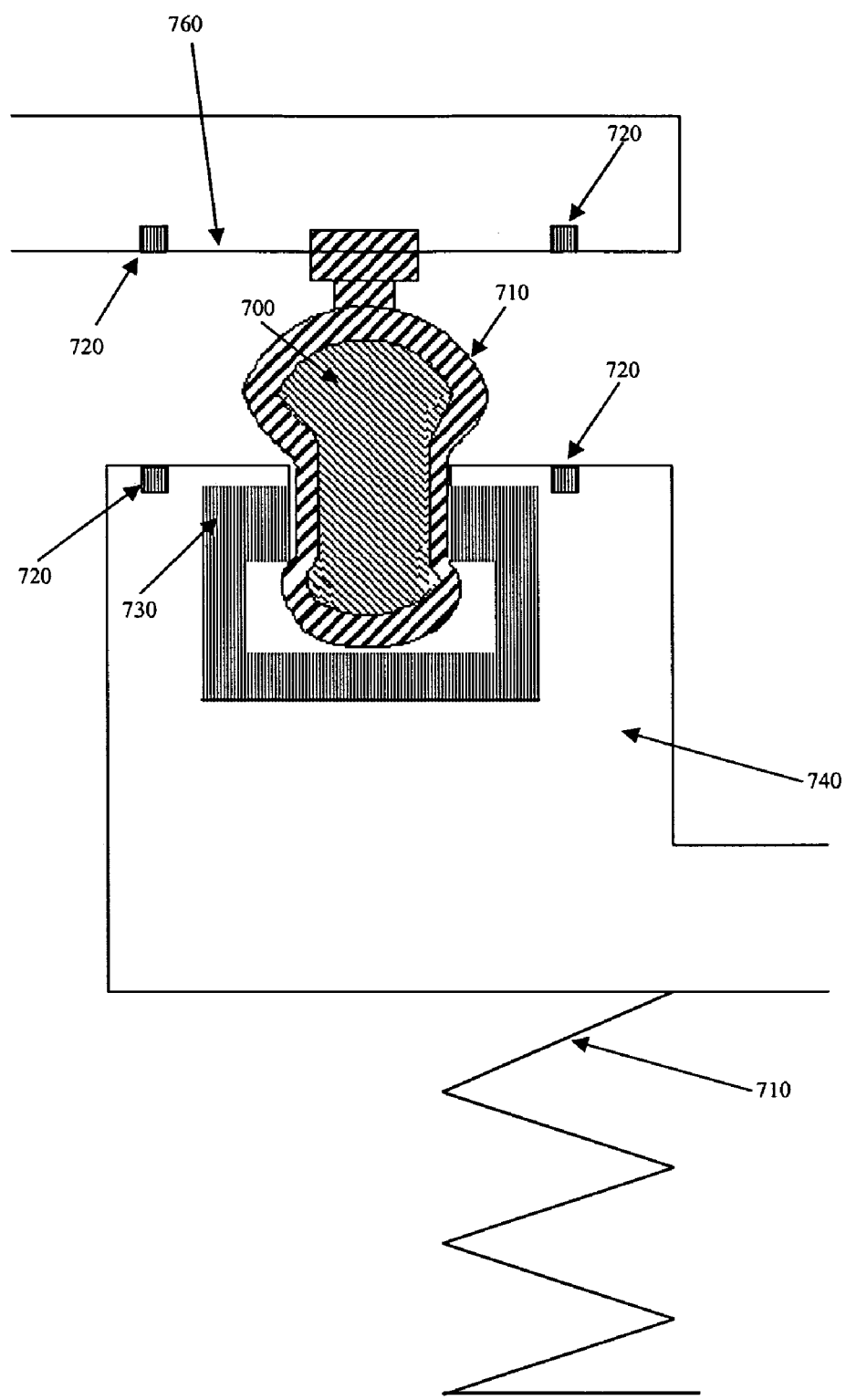
FIG. 7 is a detailed view of a portion of FIG. 4.

FIG. 7 is an illustration of another embodiment of the present invention. FIG. 7 shows a moving component 740 being urged by spring 710 toward surface 760. In an embodiment, magnets 720 are embedded in the surface 760 and the component 740. In an embodiment (not shown in FIG. 7) a magnetic engagement between the component and the surface is formed by using magnets on one side of the engagement and a magnetically attractive metal on the other. A sealing engagement is formed when magnet 730 is brought proximate to gasket 710. As FIG. 7 illustrates, ferrofluid 700 is attracted into magnetic gap formed by the horseshoe ends of magnet 730, thereby creating an seal between the component 740 and the surface 260.

The foregoing description of the invention refers to one or more magnets which may be a permanent magnet, but in an embodiment non-permanent magnets such as electromagnets may be used. Where magnets are used that may have the magnetic field activated and deactivated, the seal may be engaged and disengaged by activating and deactivating the magnetic field.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A ferrofluid based magnetic seal, comprising:
   at least one gasket, the at least one gasket retaining a core comprising a ferrofluid;
   a first component, at least a portion of the first component being in sealed engagement with at least a portion of the at least one gasket;
   a second component, wherein the second component has at least one magnet affixed thereto, the at least one magnet having a cavity, the cavity being in open communication with the exterior of the at least one magnet through a gap smaller than the width of the cavity;
   wherein at least a portion of the at least one gasket has a width larger than the width of the gap; and
   wherein the seal is formed as a result of the magnetic attraction between the ferrofluid and the at least one magnet causing the at least one gasket to be drawn toward a magnetic field associated with the at least one magnet and further causing at least a portion of the at least one gasket to be drawn into the cavity of the at least one magnet through the gap in the at least one magnet.

2. The ferrofluid based magnetic seal of claim 1, wherein the at least one gasket comprises a closed cell material.

3. The ferrofluid based magnetic seal of claim 2, wherein the closed cell material is flexible.

4. The ferrofluid based magnetic seal of claim 3, wherein the closed cell material is an elastomer.

5. The ferrofluid based magnetic seal of claim 4, wherein the elastomer is selected from the set of rubber, neoprene or plastic.

6. The ferrofluid based magnetic seal of claim 1, wherein at least one of the at least one magnet is embedded in at least one of the first component or the second component.

7. The ferrofluid based magnetic seal of claim 1, wherein the at least one magnet is positioned such that when the first component and the second component are in close proximity, the at least one magnet is positioned substantially along the length of the at least one gasket.

8. The ferrofluid based magnetic seal of claim 1, wherein a first face of the first component and a first face of the second component are substantially coplanar when the first and second components are in close proximity to each other.

9. The ferrofluid based magnetic seal of claim 1, wherein the at least one magnet is affixed to the second component, at least in part, using an adhesive.

10. The ferrofluid based magnetic seal of claim 1, wherein at least a portion of the sealed engagement between the at least a portion of the first component and the at least a portion of the at least one gasket is formed by at least one selected from the set of: adhesive bonding, thermal welding, sonic welding, chemical welding, mechanical engagement or magnetic engagement.

11. A gasketed closure comprising:
a first component and a second component, the first and second component being repositionable in relation to each other, the first component having a closure region that comes in close proximity with a closure region of the second component when the first and second components are positioned in an extreme position with respect to their repositionable relationship;
a gasket retaining a core comprising a ferrofluid, the gasket being at least substantially the length of the closure region of the second component;
the closure region of the first component comprising at least one magnet for attracting the ferrofluid, the at least one magnet having a cavity, the cavity being in open communication with the closure region of the first component through a gap in the at least one magnet smaller than the width of the cavity, the attraction between the ferrofluid and the at least one magnet causing at least a portion of the gasket to be drawn into the cavity of the at least one magnet through the gap in the at least one magnet and thereby causing the gasket to make a seal between itself and the closure region of the first component; and
the closure region of the second component having a sealing means causing the gasket to make a seal between itself and the closure region of the second component.

12. The gasketed closure of claim 11, wherein the sealing means comprises an adhesive bond between the gasket and the second closure region.

13. The gasketed closure of claim 11, wherein the sealing means comprises a welded bond between the gasket and the second closure region.

14. The gasketed closure of claim 13, wherein the welded bond is a chemical bond.

15. The gasketed closure of claim 13, wherein the welded bond is a electronic bond.

16. The gasketed closure of claim 13, wherein the welded bond is a thermal bond.

17. The gasketed closure of claim 11, wherein the sealing means of the second component is a magnetic field.

18. The gasketed closure of claim 11 wherein the at least one magnet is an electromagnet.

* * * * *